United States Patent [19]

Marcatili et al.

[11] Patent Number: 4,765,706
[45] Date of Patent: Aug. 23, 1988

[54] OPTICAL COMMUNICATIONS SYSTEM INCLUDING A DIRECTIONAL COUPLER

[75] Inventors: Enrique A. J. Marcatili, Rumson; Thomas H. Wood, Highlands, both of N.J.

[73] Assignee: American Telephone and Telegraph Co., AT&T Bell Labs., Murray Hill, N.J.

[21] Appl. No.: 891,395

[22] Filed: Jul. 29, 1986

[51] Int. Cl.$^4$ ............... G02B 6/28; H01J 5/16; G02F 1/00
[52] U.S. Cl. ............... 350/96.16; 350/96.15; 350/96.18; 250/227; 455/606; 455/607; 455/610; 455/613
[58] Field of Search ............ 350/96.10, 96.15, 96.16, 350/96.18, 96.29, 96.30; 455/610, 612, 606, 607, 613; 370/1, 3; 250/227

[56] References Cited

U.S. PATENT DOCUMENTS

| | | | |
|---|---|---|---|
| 3,832,030 | 8/1974 | Gloge | 350/96.18 |
| 4,019,051 | 4/1977 | Miller | 350/96.15 |
| 4,076,375 | 2/1978 | Muska et al. | 350/96.15 |
| 4,165,496 | 8/1979 | Di Domenico, Jr. et al. | 350/96.15 |
| 4,173,390 | 11/1979 | Kach | 350/96.16 |
| 4,234,969 | 11/1980 | Singh | 350/96.16 X |
| 4,310,217 | 1/1982 | de Mendez et al. | 350/96.16 |
| 4,452,505 | 6/1984 | Gasparian | 350/96.15 |
| 4,474,431 | 10/1984 | Bricheno | 350/96.15 |
| 4,516,828 | 5/1985 | Steele | 350/96.16 |
| 4,549,782 | 10/1985 | Miller | 350/96.16 |
| 4,590,619 | 5/1986 | Winzer | 350/96.15 X |
| 4,630,255 | 12/1986 | Gouali et al. | 350/96.15 X |
| 4,654,890 | 3/1987 | Hasegawa et al. | 455/607 |
| 4,676,594 | 6/1987 | Presby | 350/96.15 X |
| 4,682,843 | 7/1987 | Mahlein et al. | 350/96.15 |
| 4,712,858 | 12/1987 | Presby | 350/96.15 |
| 4,717,229 | 1/1988 | Cutler | 350/96.15 |

FOREIGN PATENT DOCUMENTS

| | | | |
|---|---|---|---|
| 2615780 | 9/1977 | Fed. Rep. of Germany | 350/96.16 |
| 55-91243 | 7/1980 | Japan | 455/607 |
| 56-57348 | 5/1981 | Japan | 455/607 |
| 2020447 | 11/1979 | United Kingdom | 350/96.16 |

OTHER PUBLICATIONS

"Tapped Tee Single-Mode Data Distribution System", *IEEE Journal of Quantum Electronics*, vol. QE-17, 1981, pp. 941-946, by C. A. Villarruel et al.
"Optical Directional Coupler Using Tapered Sections in Multi-Mode Fibers", *Applied Physics Letters*, vol. 28, 1976, pp. 528-529, by T. Ozeki et al.
"Fabrication of an Access Coupler with Single-Strand Multi-Mode Fiber Waveguides", *Applied Optics*, vol. 15, 1976, pp. 2629-2630, by M. K. Barnowski et al.

*Primary Examiner*—William L. Sikes
*Assistant Examiner*—Brian M. Healy
*Attorney, Agent, or Firm*—Peter A. Businger; Oleg E. Alber

[57] ABSTRACT

Low-loss coupling between a local feed connection or node, and a multi-mode optical fiber bus is provided by reflective insertion of a relatively small number of modes into the bus fiber. Essentially all input power available at the node is thus inserted into the bus, while but a small portion of power is extracted from the bus.

12 Claims, 2 Drawing Sheets

OPTICAL COMMUNICATIONS SYSTEM INCLUDING A DIRECTIONAL COUPLER

TECHNICAL FIELD

The invention is concerned with communications systems including optical couplers.

BACKGROUND OF THE INVENTION

Optical communications based on the use of waveguide optical fibers have become a commercially viable alternative to transmission by means of wire pairs, coaxial cables, and microwave broadcasting at least for point-to-point connections, e.g., between major urban centers and between high-capacity computer facilities. Suitability of fibers for such connections is predicated on well-known fiber characteristics, among which are low loss, small size, low weight, high bandwidth, and near-perfect electrical isolation. These characteristics are potentially significant also in communications networks in which more elaborate interconnection is required such as, in particular, in so-called local area networks (LAN).

One relevant aspect in the design of local area networks is the need for passive connections between transmission lines, e.g., for feeding signals from a multiplicity of end stations onto a fiber serving as a "bus", as well as tapping into such fiber to extract a signal intended for a specific station or "node". Desirably, a tap is made so as to remove only a small fraction of the power traveling on a bus. For the sake of efficiency of a feed, however, it is desirable to effect transfer of all or almost all of the locally available power.

This desired coupling characteristic, namely high coupling efficiency for signal insertion, combined with tapping of but a small fraction of power, has been found impossible to realize because proposed optical couplers are subject to the principle of reciprocity, i.e., the requirement that the fraction of local transmitter power injected into the bus be equal to the fraction of power split off the bus into the local receiver. And, since the coupling fraction for tapping must be relatively small, reciprocity requires that only a corresponding small fraction of the local transmitter power be injected into the bus, thereby wasting a large percentage of transmitter power. Typical in this respect are systems as disclosed in the following papers:

C. A. Villarruel et al., "Tapped Tee Single-mode Data Distribution System", *IEEE Journal of Quantum Electronics*, Vol. QE-17 (1981), pp. 941–946;

T. Ozeki et al., "Optical Directional Coupler Using Tapered Sections in Multi-mode Fibers", *Applied Physics Letters*, Vol. 28 (1976), pp. 528–529; and M. K. Barnoski et al., "Fabrication of an Access Coupler with Single-strand Multi-mode Fiber Waveguides", *Applied Optics*, Vol. 15 (1976), pp. 2629–2630.

One attempt at designing a coupler arrangement not subject to the reciprocity principle is disclosed in the paper by H. H. Witte, "Passive T-Bus with Asymmetrical 4-Port Couplers", *Fiber and Integrated Optics*, Vol. 3 (1980), pp. 253–261, such arrangement including optical waveguides joined end-to-end with a lateral offset of the optical axes. However, the improvement to be expected with this approach as compared with couplers subject to the reciprocity principle was found to be relatively small; moreover, resulting couplers can be expected to have high coupling loss.

Accordingly, there remains a need for a low-loss coupler which provides for feeding essentially all power from a local node into a fiber serving as a bus, while tapping but a small portion of power from the bus.

SUMMARY OF THE INVENTION

The invention provides for low-loss coupling between a fiber bus and a local feed connection, such connection being characterized by insertion of essentially all power from a node into the bus and extraction of but a fraction of power from the bus. Coupling is into a multi-mode bus fiber by means of a reflector element situated in the core region of the bus fiber, coupled radiation having significantly fewer modes as compared with the number of modes propagating in the bus fiber.

The invention is applicable to single-frequency as well as to multi-frequency systems, and transmitted radiation may be ultraviolet, visible, or infrared, the latter being particular current interest in optical communications.

DETAILED DESCRIPTION

Figure 1:
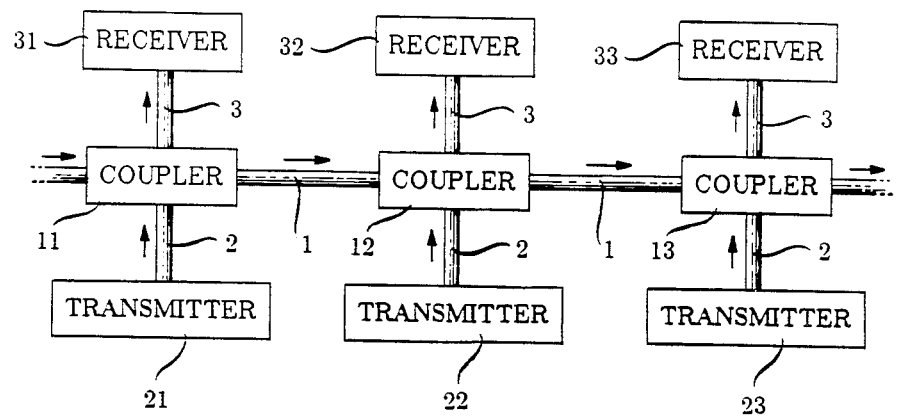
FIG. 1 is a diagram of a portion of a local area network including a bus fiber and three local nodes with taps and feeds in accordance with the invention.

FIG. 1 shows multi-mode bus fiber 1; input connection means 2 which may take the form of feed fibers having limited mode-carrying capability as compared with bus fiber 1; output connection means 3 which may take the form of single- or multi-mode tap fibers; couplers 11, 12, and 13; transmitters 21, 22, and 23; and receivers 31, 32, and 33. Multi-mode bus fiber 1 provides for interconnection of couplers 11, 12 and 13 in sequence; input connection means 2 provide for connections from transmitters 21, 22, and 23 to couplers 11, 12, and 13, respectively; and output connection means 3 provide for connections from couplers 11, 12, and 13 to receivers 31, 32, and 33, respectively. The direction of light propagation is indicated by arrows.

Figure 2:
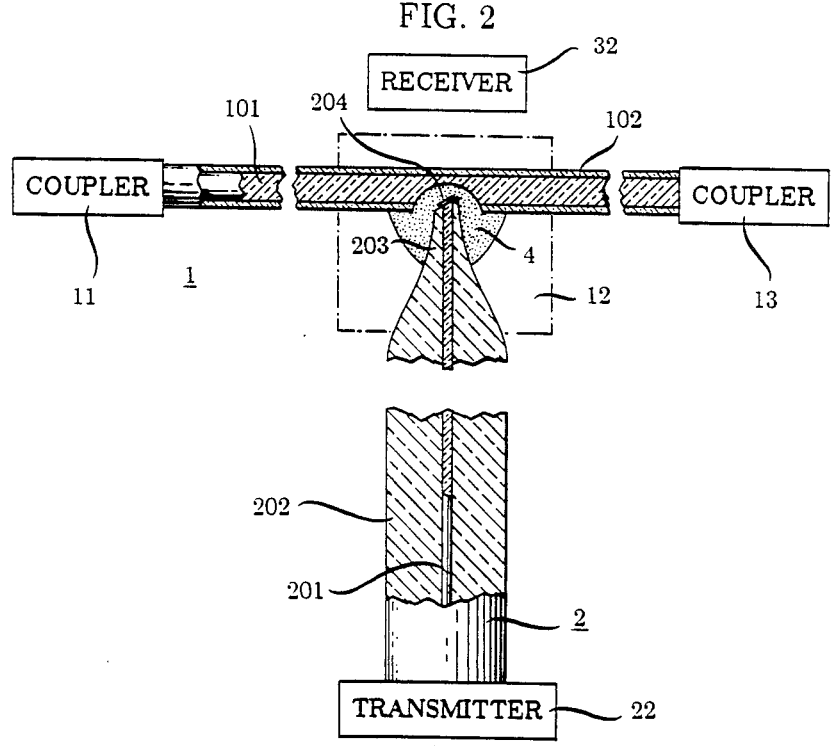
FIG. 2–4 are schematic, cross-sectional representations of preferred embodiments in accordance with the invention.

FIG. 2 shows coupler 12 between multi-mode bus fiber 1 and single-mode feed fiber 2. Bus fiber 1 is connected to couplers 11 and 13, and feed fiber 2 is connected to transmitter 22. Bus fiber 1 has core 101 and cladding 102 and has an indentation as produced, e.g., by localized etching through cladding 102 and into core 101. Feed fiber 2 has core 201 and cladding 202 and terminates in a tapered portion 203. The tip of portion 203 is cut at an angle and equipped with mirror 204 which may be made by deposition of a metal such as, e.g., gold, aluminum, or silver, or any other suitable metallic or dielectric material. The reflective material is chosen so as to produce essentially complete reflection of all light traveling in fiber 2, as well as of a small portion of light traveling in fiber 1, the latter thus being tapped by reflection into receiver 32. Also, reflection may be produced by a grating. Index-matching epoxy 4 serves to permanently position the tip of feed fiber 2 with respect to bus fiber 1. (Advantageously, in the interest of minimized loss, epoxy may be chosen to have distinct core and cladding components which are index-matched to corresponding fiber portions.) An index-matching connection is also desirable between fiber 1 and receiver 32; alternatively, connection may be made by an optical fiber, with index matching to fiber 1 and receiver 32.

Deposition of the material of mirror 204 may be in the presence of a mask which leaves the desired mirror region uncovered. Mask material may consist of a photosensitive resist material, in which case the mirror region can be defined in the resist layer by light introduced through the feed fiber itself. Subsequent dissolving of the exposed material produces the desired opening in the mask.

Manufacture of a coupler as depicted in FIG. 2 may involve determining the proper alignment and positioning of the reflective tip of tapered portion 203. This can be effected by injecting desired light by means of fiber 2 prior to hardening of epoxy 4, while fibers 1 and 2 are being moved relative to each other and as light output is monitored at the output end of fiber 1. Then, once positioning is such that light output is satisfactory, epoxy 4 is allowed to harden.

Figure 3:
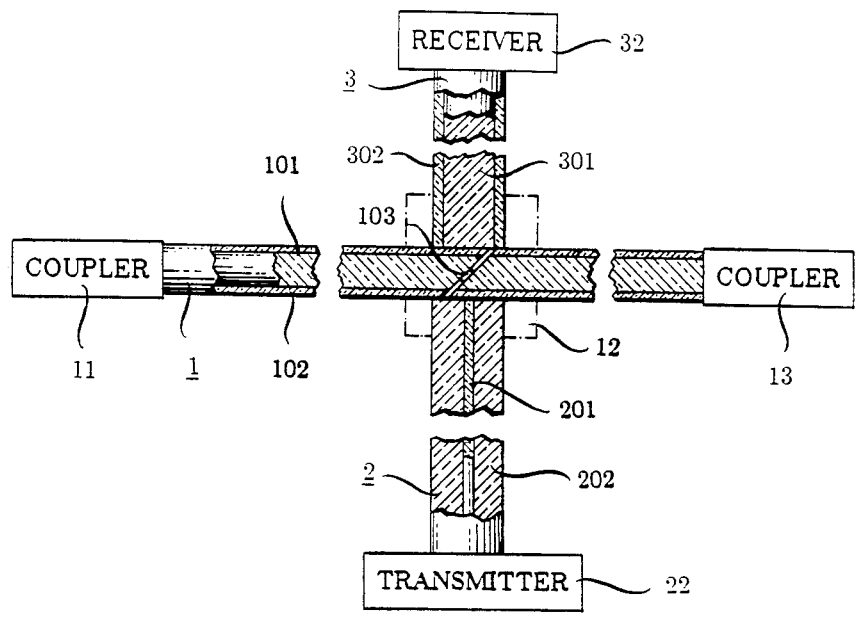

FIG. 3 shows coupler 12 between multi-mode bus fiber 1, singlemode feed fiber 2, and multi-mode tape fiber 3. Bus fiber 1 has a core portion 101 and a cladding portion 102, feed fiber 2 has a core portion 201 and a cladding portion 202, and tape fiber 3 has a core portion 301 and a cladding portion 302. Bus fiber 1 is connected to couplers 11 and 13, feed fiber 2 is connected to transmitter 22, and tap fiber 3 is connected to receiver 32. Bus fiber 1 is shown cut and polished at an angle, and a reflective spot 103 is shown at the interface of the rejoined fiber sections.

Application of the reflective spot 103 may involve use of a mask on the polished surface, followed by deposition of reflective material. After mirror deposition, the two fiber sections may be permanently rejoined by means of an index-matched adhesive material. Index-matched attachment is also desirable between bus fiber 1 and feed fiber 2, and between bus fiber 1 and tap fiber 3.

Figure 4:
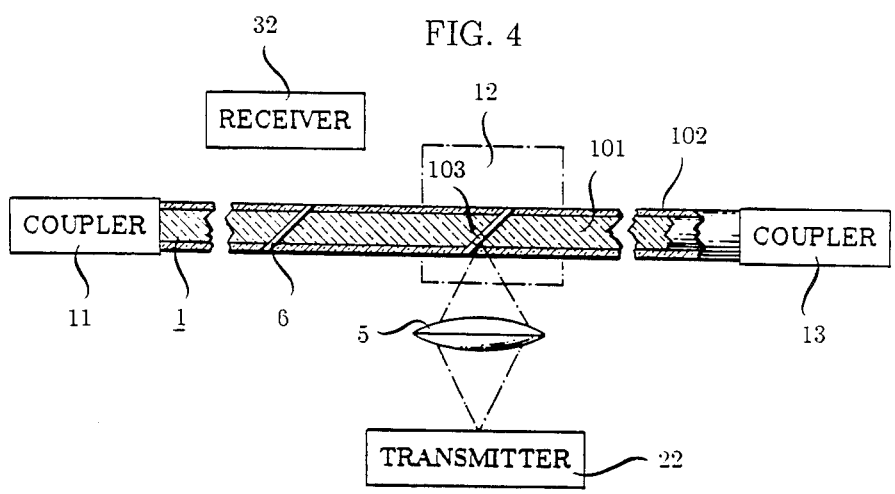

FIG. 4 shows coupler 12 which provides for coupling of light from transmitter 22 into multi-mode bus fiber 1 comprising core portion 101 and cladding portion 102. Bus fiber 1 is shown cut at an angle, and a reflective spot 103 is shown at the interface. Light from transmitter 22 is focused onto reflective spot 103 by means of a lens 5, a focusing mirror, or any suitable focusing combination. Focusing is called for especially when the diameter of an input beam is not sufficiently small as compared with the diameter of the core of the bus fiber.

Bus fiber 1 is connected to couplers 11 and 13 and comprises an additional reflective interface 6 for coupling a desired fraction of light from bus fiber 1 into receiver 32. This arrangement results in physical separation of means for reflecting radiation into and out of the bus fiber, the tap preceding the feed as shown in FIG. 4 or else following it in the direction of light propagation. While less efficient than the arrangement of FIG. 2 and 3 where no radiation is taken from the bus fiber other than the radiation necessarily reflected by the input coupler, the arrangement of FIG. 4 is advantageous on account of assured optical separation of the receiver from input radiation. Furthermore, use of a uniformly reflective surface across the bus fiber for tapping prevents speckle in tapped radiation. (Other means are available for limiting speckle; for example, it is advantageous in this respect to use a relatively incoherent light source such as, e.g., a light-emitting diode or a multi-frequency laser. Also, by electrically adding a suitable high-frequency signal during transmission, it is possible to minimize speckle even in a single-frequency laser.)

While coupling of single-mode radiation from local nodes results in a particularly simple embodiment of the invention, it is also possible to provide for multi-mode input so long as the number of modes of input radiation is significantly less than the number of modes capable of propagating in the bus fiber. (The number of modes capable of propagating in a fiber is directly related to fiber core diameter as well as to refractive index difference between fiber core and cladding portions.) Typically, when a feed fiber is used, the number of modes of input radiation is equal to the number of feed fiber modes. Such is the case also when radiation transmitted by a feed fiber is focused, e.g., by attaching a lens element to the end of the feed fiber. If, however, a focusing system is used without a feed fiber, the number of modes of input radiation will be determined by the light source.

Preferably, the number of modes to be inserted by reflection does not exceed 10 percent of the number of modes in the bus fiber. Also, the portion of cross-sectional area taken up by an essentially totally reflective surface in the core portion of the bus fiber preferably does not exceed 50 percent of such area.

Among further variants within the scope of the invention is the use of a reflective surface in the bus fiber light path which comprises an essentially totally reflective area for light input and a surrounding less reflective area which provides for additional light output. This embodiment can be viewed as resulting from combining, on a single reflective surface, the totally reflective mirror 103 (see FIG. 4) with the partially reflective mirror 6. As a refinement of this structure, it is possible to provide a surface with a mirror layer whose reflectivity is graded, preferably such that reflectivity is highest at a point of highest input radiation intensity; for example, a reflectivity profile may be chosen in direct relationship with the intensity profile of input radiation.

What is claimed is:

1. An optical communication system comprising
a first optical fiber having a core-cladding waveguiding structure capable of propagating wave energy in a first plurality of modes, and
a plurality of nodes distributed along the first fiber, each node including a coupler for coupling wave energy between the said first fiber and a transmitter and a receiver of optical radiation,
each of said couplers comprising means for inserting into the first fiber, for propagation in a selected direction, a significant portion of the power in at least one mode being transmitted, and means for withdrawing from the first fiber a significant portion of the power in at least one, but not all, of the modes propagating in the said first fiber in the said selected direction, at least said inserting means comprising optical reflector means,
the number of modes being inserted at any node being significantly smaller than the number of said first plurality of modes,
the power being inserted by any one or more of said inserting means reducing the loss of power being withdrawn along the said length of the first fiber.

2. Optical communications systems of claim 1 wherein said at least one mode is numerically less than or equal to 10 percent of said first plurality of modes.

3. Optical communications system of claim 1 comprising optical connection means connecting said transmitter to said first optical fiber, said optical connection means comprising a second optical fiber.

4. Optical communications system of claim 3 wherein said second optical fiber is capable of transmitting a single mode of optical radiation.

5. Optical communications system of claim 1 comprising optical connection means connecting said transmitter to said first optical fiber, said optical connection means comprising focusing means.

6. Optical communications system of claim 5 wherein said focusing means is designed to reduce the diameter of said at least one mode.

7. Optical communications system of claim 5 wherein said focusing means comprises a lens.

8. Optical communications system of claim 1 wherein said first optical fiber has an indentation, and said optical reflector means is disposed at least in part within said indentation.

9. Optical communications system of claim 1 wherein said first optical fiber comprises two sections having an interface comprising a reflective area.

10. Optical communications system of claim 1 wherein said receiver comprises an optical detector, said receiver being optically connected to said first optical fiber such that radiation being withdrawn from the first optical fiber by said reflector means reaches said optical detector.

11. Optical communications system of claim 10 wherein said receiver is optically connected to said first optical fiber by means of a third optical fiber capable of propagating one or more of modes, the number of modes being less than said first plurality of modes.

12. Optical communications system of claim 11 wherein said system comprises tapping means other than said optical connection means for withdrawing optical energy from said first optical fiber to said receiver, said tapping means comprising a partially reflective interface in said first optical fiber, said partially reflective interface being distinct from said optical reflector means.

* * * * *